United States Patent
Nakahira et al.

(10) Patent No.: US 6,819,973 B2
(45) Date of Patent: Nov. 16, 2004

(54) CONTROL APPARATUS FOR CUTTING MACHINE AND METHOD OF INDICATION

(75) Inventors: Hiroki Nakahira, Nara (JP); Katsuaki Ono, Nara (JP)

(73) Assignee: Mori Seiki Co., Ltd. (JP)

( * ) Notice: Subject to any disclaimer, the term of this patent is extended or adjusted under 35 U.S.C. 154(b) by 149 days.

(21) Appl. No.: 10/051,522

(22) Filed: Dec. 21, 2001

(65) Prior Publication Data

US 2003/0145678 A9 Aug. 7, 2003

(30) Foreign Application Priority Data

Dec. 21, 2000 (JP) .................................. P. 2000-389193

(51) Int. Cl.[7] .............................................. G06F 19/00
(52) U.S. Cl. ...................... 700/193; 700/176; 74/816
(58) Field of Search .............................. 700/193–194, 700/175–176; 74/816; 33/642

(56) References Cited

U.S. PATENT DOCUMENTS 4,776,247 A * 10/1988 Kiya ........................... 82/118

FOREIGN PATENT DOCUMENTS

| JP | 3-10743 | 1/1991 |
|----|---------|--------|
| JP | 11-216641 | 8/1999 |
| JP | 2000-141164 | 5/2000 |
| WO | WO 99/10785 | 3/1999 |

OTHER PUBLICATIONS

Naoki et al (Translated Japanese Patent Publication No. 2000–141164) Published May 23, 2000.*
Hisao (Translated Japanese Patent Publication No. 05–158515) Published Jun. 25, 1993.*
Patent Abstracts of Japan,, Publication No. 2000–141164, Publication Date May 23, 2000, 1 page.
Patent Abstracts of Japan, Publication No. 11–216641, Publication Date Aug. 10, 1999, 1 page.
Patent Abstracts of Japan, Publication No. 03–010743, Publication Date Jan. 18, 1991, 1 page.
Patent Abstracts of Japan, Publication No. 05158515, Publication Date Jun. 25, 1993, 1 page.
Patent Abstracts of Japan, Publication No. 2000148219, Publication Date May 26, 2000, 1 page.
European Search Report dated Mar. 6, 2002, 3 pages.

* cited by examiner

*Primary Examiner*—Albert W. Paladini
*Assistant Examiner*—Alexander Kosowski
(74) *Attorney, Agent, or Firm*—Osha & May L.L.P.

(57) ABSTRACT

The present invention is directed to provide a control apparatus for a cutting machine in which offset values on coordinates relative to the cutting machine are indicated, regardless of the position of the turret, and an operator need not calculate the offset values in the cutting process. This invention is characterized in that an X-axis offset value ($\Delta X$) and a Z-axis offset value ($\Delta Z$) of a cutting edge of the cutting tool when the turret 1 has been turned to an arbitrary angle are converted to values on coordinates relative to the cutting machine, and indicated.

4 Claims, 9 Drawing Sheets

| TOOL | | TURNING ANGLE | OFFSET ON X AXIS ($\Delta X$) | OFFSET ON Z AXIS ($\Delta Z$) |
|---|---|---|---|---|
| 1 | TURNING | -90.0° (INITIAL POSITION) | -22.00 ($\Delta X_0$) | 400.00 ($\Delta Z_0$) |
| 2 | | -40.0° | 598.69 | 265.54 |
| 3 | (WEAR COMPENSATION VALUE) | | $\Delta X_t$ -0.09 -0.24 -0.29 | $\Delta Z_t$ -0.04 -0.09 -0.14 |

| TURNING | 0.0° | 800.00 | 11.00 |
|---|---|---|---|

| TOOL | TURNING ANGLE (α) | ROTATION ANGLE (β) | OFFSET ON X AXIS (ΔX) | OFFSET ON Z AXIS (ΔZ) | OFFSET ON Y AXIS (ΔY) |
|---|---|---|---|---|---|
| TURNING | −90.0° (INITIAL POSITION) | 0.0° | −22.00 (ΔX$_0$) | 400.00 (ΔZ$_0$) | 0.00 (ΔY$_0$) |
|  | −40.0° | 0.0° | 598.69 | 265.54 | 0.00 |
|  | −40.0° | 120.0° | 617.98 (ΔX$_r$) | 254.05 (ΔZ$_r$) | −8.66 |
|  | (WEAR COMPENSATION VALUE) |  | ΔX$_t$ −0.08 −0.13 | ΔZ$_t$ −0.05 −0.10 | ΔY$_t$ −0.06 −0.10 |

CONTROL APPARATUS FOR CUTTING MACHINE AND METHOD OF INDICATION

BACKGROUND OF THE INVENTION

1. Field of the Invention

The present invention relates to indication of offset values of a cutting tool in a control apparatus which is employed in a cutting machine (specifically an NC lathe or machining center) for performing various cutting according to numerical control.

Particularly, the present invention relates to the control apparatus for the cutting machine in which a turret turns around a B-axis so that cutting process can be conducted at an arbitrary position (capable of indexing at the arbitrary position). Further, the present invention relates to the control apparatus for the cutting machine in which the cutting tool can rotate around the tool axis.

2. Description of the Related Art (1) In a conventional control apparatus for the cutting machine based on the numerical control, an offset value of a cutting edge of the cutting tool has been indicated, and numerical values for conducting the cutting have been inputted referring to the values. There have been some cutting machines such as the NC lathe and machining center, in which the cutting tool turns around the B-axis. Here, the B-axis is a reference axis regulated by JIS which means an axis perpendicular to both the X-axis and Z-axis of the turret 1 as shown in FIG. 1.

(2) There have been heretofore those control apparatuses in which the offset values are indicated on the bases of coordinate axes relative to the turret, when the turret has turned with respect to the B-axis. For example, in the case where the offset values of the cutting tool have been already determined, the same offset values are indicated at any positions where the turret has turned. In the case where the offset values are (X100, Z25) for example, even though the turret has turned by 90 degree, the offset values have been indicated as (X100, Z25).

In this case, an operator must calculate for himself the offset values according to the position after the turn, and input the numerical values based on the calculated values. This has been a heavy task to the operator, and also there has been a risk of miscalculation.

Particularly, because the X-axis offset value is indicated by diameter, when the turret has turned by 90 degree, the offset value must be twice as much as the Z-axis value and a half of the X-axis value, and the calculation has been annoying. In the case where the turning angle is 40 degree or so, it has been impossible to convert the offset values by mental arithmetic.

(3) Meanwhile, there is Japanese Publication No. JP-A-2000-141164 of unexamined Patent Application which relates to a cutting machine in which the turret can turn around the B-axis and tool compensation values (the offset values) of a cutting edge of the tool are not indicated relative to the turret. However, in this patent application, the tool compensation values corresponding to predetermined turning angles, such as the turns of the turret by every 90 degree, are indicated. Therefore, in the art disclosed in this patent application, the tool compensation values (the offset values) when the turret has turned to arbitrary angles cannot be indicated. Moreover, there has been a problem that if the tool compensation values at every turning angle are to be stored, it will cause an overload of a memory section in the control apparatus.

(4) Further, the above-described problems have existed also, when the cutting tool is rotated around the tool axis.

SUMMARY OF THE INVENTION

In view of the above, it is an object of the invention to provide a control apparatus for a cutting machine having a turret which can turn to arbitrary positions, in which offset values on coordinates relative to the cutting machine are indicated, regardless of the position of the turret, and an operator need not calculate the offset values in the cutting process.

It is another object of the invention that the offset values with respect to arbitrary turning angles of the turret can be indicated, while reducing load on a memory section in the control apparatus.

It is a further object of the invention to make it unnecessary to convert the offset values of a cutting edge of the tool after rotation, even in a control apparatus for a cutting machine which can rotate to an arbitrary position relative to a tool axis.

(1) This invention relates to a control apparatus for a cutting machine adapted to conduct numerical control and having a turret 1 which can be turned to arbitrary positions, characterized in that an X-axis offset value ($\Delta X$) and a Z-axis offset value ($\Delta Z$) of a cutting edge 3 of a cutting tool when the turret 1 has been turned to an arbitrary angle are converted to values on coordinates relative to the cutting machine, and indicated.

Here, the X-axis offset value ($\Delta X$) and the Z-axis offset value ($\Delta Z$) are defined as values for compensating a difference between a position of the cutting edge of the tool assumed on a prepared cutting program and an actual position of the cutting edge, when they are different from each other. Specifically, on coordinates defined by two axes (the X-axis and the Z-axis) perpendicular to each other concerning the positions of the cutting edge of the tool, the value twice as much as the X-axis value (indication by diameter) is referred to as "the X-axis offset value", and the Z-axis value is referred to as "the Z-axis offset value".

In the conventional cutting machine, the same offset values have been indicated even when the turret 1 has turned around the B-axis. This is because the offset values relative to the turret 1 have been indicated. On the other hand, in this invention, the offset values are not relative to the turret 1, but always indicated as points on the coordinates relative to the cutting machine, at any position where the turret 1 has turned. This facilitates calculation of compensation values to be inputted in the cutting process. For example, in an embodiment as shown in FIGS. 1 to 3, an initial position is set at a position of –90 degree of the turret 1 in FIG. 1, and the offset values after the turret 1 has turned are indicated on the basis of this coordinate.

Also in this invention, at every turn of the turret 1, the offset values are converted according to its turning angle ($\alpha$) and indicated. Accordingly, the memory section of the control apparatus need not store the offset values at every turning angle, and thus, the load with respect to a capacity for memory will be decreased.

(2) One of desirable embodiments of the invention is the above described control apparatus, characterized in that wear compensation values ($\Delta Xt$, $\Delta Zt$) are indicated in relation to the X-axis offset value ($\Delta X$) and the Z-axis offset value ($\Delta Z$). Further, this control apparatus is preferably in such a form that the inputted wear compensation values ($\Delta Xt$, $\Delta Zt$) may be indicated in order of the input.

An ordinary cutting process is not completed by a single cutting, but several cuttings must be conducted. This is done so as to avoid cutting too much when the cutting is conducted at a time, and so as to compensate for wear of the cutting edge of the tool.

When such several cuttings are conducted, the operator measures sizes of a workpiece to be cut after the cutting process, and further cuts a portion exceeding a preset value by inputting the wear compensation values. In this case, the wear compensation values are inputted with reference to the X-axis offset value (ΔX) and the Z-axis offset value (ΔZ) which are indicated. However, the wear compensation values to be inputted at a second and successive cuttings must be set with reference to the wear compensation values which have been inputted at a previous cutting, so that a further cutting may be conducted in addition to the inputted values.

For example, in case where the offset value is (X 100.0) and the wear compensation value at a first cutting is (−0.1) in cutting an outer periphery, the compensation value at the second cutting must be smaller than (−0.1). If the compensation value of (−0.05) is inputted at the second cutting, the cutting will not be conducted. In this manner, not only the offset value but also the wear compensation value at the previous cutting has a significant meaning when inputting the wear compensation value.

Accordingly, this invention is able to provide the operator with guidelines for the wear compensation values by inputting not only the offset values on the X-axis and the Z-axis, but the wear compensation values (ΔXt, ΔZt) with reference to the offset values. In addition, by providing means for indicating the inputted wear compensation values in order, the operator can see a history of the wear compensation values in the past, and can easily set the next wear compensation values.

(3) This invention also relates to the above described control apparatus, which can be implemented in such a manner that when the turret 1 has been turned to a turning angle (α), an X-axis value of the tool (L2), a Z-axis value of the tool (L1), an X-axis value of the turret (L4) and a Z-axis value of the turret (L3) are converted according to the following equations to calculate the aforesaid X-axis offset value (ΔX) and the Z-axis offset value (ΔZ).

$$\Delta X = (\Delta Az \cdot \cos \alpha - \Delta Ax \cdot \sin \alpha) \times 2 \qquad \text{(Equation 1)}$$

$$\Delta Ax = L2 + L4$$

$$\Delta Az = L1 + L3$$

$$\Delta Z = -\Delta Az \cdot \sin \alpha - \Delta Ax \cdot \cos \alpha \qquad \text{(Equation 2)}$$

(α: turning angle of the turret 1 relative to the B-axis. A vertically downward direction of the X-axis in FIG. 1 is set to be 0 degree)

This invention is characterized in that any position to which the turret 1 has turned is converted to points on the coordinates relative to the cutting machine, and indicated. There is no restriction in the equations for the conversion. In an embodiment in which the size L3 or L4 of the turret 1 varies according to the turn of the turret 1, in case where the size L1 or L2 of the tool varies, and in case where an axis of the turn is not perpendicular to the X-axis and the Z-axis, it is possible to perform the conversion by employing appropriate conversion equations taking those variations into consideration.

The above described equations for the conversion are employed in one of the embodiments according to this invention, and the equations for the conversion when the turret 1 simply turns around the B-axis are shown in FIGS. 1 to 3. Therefore, in the embodiment in which the turret 1 turns around the B-axis, the invention described in the above item (1) can be implemented according to the above-described equations for the conversion.

(4) This invention also relates to a method of indicating an X-axis offset value (ΔX) and a Z-axis offset value (ΔZ) of a cutting edge 3 of a cutting tool in a control apparatus for a cutting machine having a turret 1 which can be turned to an arbitrary position, characterized in that the method includes the following steps;

a step of reading an X-axis value of the tool (L2) and a Z-axis value of the tool (L1) of the selected cutting tool 2, and reading an X-axis value of the turret (L4), and a Z-axis value of the turret (L3) stored in memory (S2).

a step of reading a turning angle (α) of the turret 1 (S6).

a step of calculating the X-axis offset value (ΔX) and the Z-axis offset value (ΔZ) according to the following equations, employing the aforesaid X-axis value of the tool (L2), the Z-axis value of the tool (L1), the X-axis value of the turret (L4) and the Z-axis value of the turret (L3) (S7).

$$\Delta X = (\Delta Az \cdot \cos \alpha - \Delta Ax \cdot \sin \alpha) \times 2 \qquad \text{(Equation 1)}$$

$$\Delta Ax = L2 + L4$$

$$\Delta Az = L1 + L3$$

$$\Delta Z = -\Delta Az \cdot \sin \alpha - \Delta Ax \cdot \cos \alpha \qquad \text{(Equation 2)}$$

(α: turning angle of the turret 1 relative to the B-axis. A vertically downward direction of the X-axis in FIG. 1 is set to be 0 degree)

a step of indicating the X-axis offset value (ΔX) and the Z-axis offset value (ΔZ) (S8).

In addition to indicating the offset values, the steps of conducting the cutting work further includes, as shown in FIG. 6, a step of exchanging the tool by an ATC (Automatic Tool Changer) (S4) after the step (S2), and a step of inputting the turning angle (α) by the operator (S5) or a step of manually turning the turret 1 by the operator and reading the turning angle (α) by a CPU prior to the step (S6).

(5) This invention also relates to a control apparatus for a cutting machine adapted to conduct numerical control and in which a cutting tool 2 can be rotated around the tool axis to an arbitrary position, characterized in that an X-axis value of the tool (L2r) of a cutting edge 3 when the cutting tool 2 has been rotated to an arbitrary angle is converted to a value on a coordinate relative to the cutting machine, and an X-axis offset value (ΔXr) after the rotation is obtained from the following equations employing this X-axis value of the tool (L2r) and an X-axis value of the turret (L4), whereby this X-axis offset value (ΔXr) is indicated.

$$\Delta Xr = \Delta Axr \times 2$$

$$\Delta Axr = L2r + L4$$

In an embodiment in which the cutting tool 2 is simply rotated around the tool axis, an equation for conversion for "converting the X-axis value of the tool (L2r) of the cutting edge 3 after the rotation to the value on the coordinate relative to the cutting machine" is L2r=L2·cos β. In this manner, the operator can grasp the X-axis offset value, regardless of a rotation angle (β) of the cutting tool 2, even in the case where the cutting tool 2 has been rotated around the tool axis to an arbitrary position, thus enabling a wear compensation value to be easily inputted.

(6) This invention also relates to a control apparatus for a cutting machine adapted to conduct numerical control and in which a cutting tool 2 can be rotated around the tool axis to an arbitrary position, characterized in that a Y-axis offset value of the tool (ΔY) of the cutting edge 3 when the cutting tool 2 has been rotated to an arbitrary angle is converted to a value on a coordinate relative to the cutting machine, and indicated. In a form in which the cutting tool 2 simply rotates around the tool axis, this Y-axis offset value (ΔY) can be obtained from an equation, ΔY=L2·sin β.

In this manner, the operator can grasp the Y-axis offset value, regardless of a rotation angle (β) of the cutting tool 2, even in case where the cutting tool 2 has been rotated around the tool axis to an arbitrary position, thereby to facilitate an input of a wear compensation value.

(7) Further, this invention relates to the above described control apparatus, characterized in that wear compensation values (ΔXt, ΔYt) are indicated in relation to the X-axis offset value (ΔXr) and the Y-axis offset value (ΔY) when the cutting tool 2 has been rotated to an arbitrary angle. Further, this control apparatus is preferably in such a form that the inputted wear compensation values (ΔXt, ΔYt) may be indicated in order of the input.

Accordingly, in the same manner as in the above item (2), this invention is able to provide the operator with guidelines for the wear compensation values. In addition, by providing means for indicating the inputted wear compensation values in order, the operator can see a history of the wear compensation values in the past, and can easily set the next wear compensation values.

One of desirable embodiments of this invention is an embodiment in which the Z-axis wear compensation value (ΔZt) is indicated in relation to the Z-axis offset value (ΔZr), and the inputted wear compensation value (ΔZt) is indicated in order of the input.

(8) This invention also relates to the control apparatus as described in the above items (1) to (3), characterized in that the cutting tool 2 can be rotated around the tool axis to an arbitrary position, the X-axis value of the tool (L2r) of the cutting edge 3 when the cutting tool 2 has been rotated to the rotation angle (β) is obtained from L2r=L2·cos β, and that the X-axis offset value and the Z-axis offset value when the turret 1 has been turned to the turning angle (α) are calculated according to the following equations, and these X-axis offset value (ΔXr) and the Z-axis offset value (ΔZr) are indicated.

$$\Delta Xr = (\Delta Az \cdot \cos \alpha - \Delta Axr \cdot \sin \alpha) \times 2 \quad \text{(Equation 3)}$$

$$\Delta Axr = L2 + L4$$

$$\Delta Az = L1 + L3$$

$$\Delta Zr = -\Delta Az \cdot \sin \alpha - \Delta Axr \cdot \cos \alpha \quad \text{(Equation 4)}$$

According to this invention, even in the case where the cutting tool 2 rotates around the tool axis, and at the same time, the turret 1 turns, the X-axis offset value and the Z-axis offset value can be indicated as values on the coordinates relative to the cutting machine. As the results, the operator can make these X-axis offset value and Z-axis offset value as guidelines, thus facilitating the input of the wear compensation values on the X-axis and the Z-axis.

BRIEF DESCRIPTION OF THE DRAWINGS

FIG. 5 is an image on the display indicating offset values, and wear compensation values;

FIG. 9 is an image on the display indicating the offset values, and the wear compensation values;

DETAILED DESCRIPTION OF THE PREFERRED EMBODIMENTS

A: Cutting Machine

Figure 1:
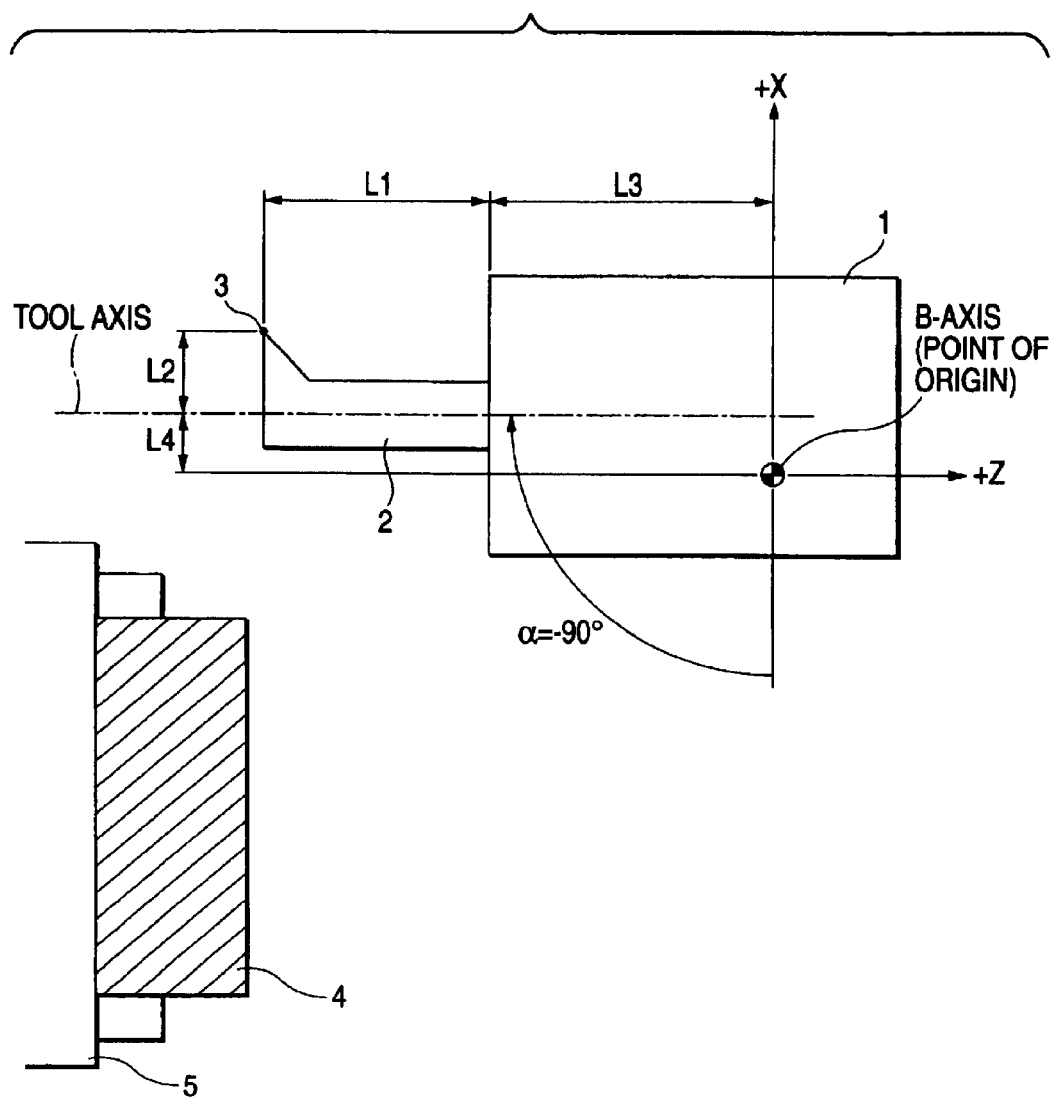
FIG. 1 is a view of turning a turret 1 (a turning angle is –90 degree) (the initial position)

This invention relates to a control apparatus in a cutting machine. A structure of a turret 1 which is controlled by this control apparatus is shown in FIG. 1. FIG. 1 shows the turret 1, a cutting tool 2 mounted on the turret 1, a workpiece 4 to be cut, and a chuck 5 for clamping the workpiece. Here, the "cutting machine" means machinery for conducting cutting by rotating the cutting tool 2 or the work 4, such as a lathe or machining center. The cutting machine can move in directions of the X-axis and the Z-axis as shown in FIG. 1 to conduct the cutting, and can adjust a relative distance between the cutting tool 2 and the workpiece 4.

Figure 2:
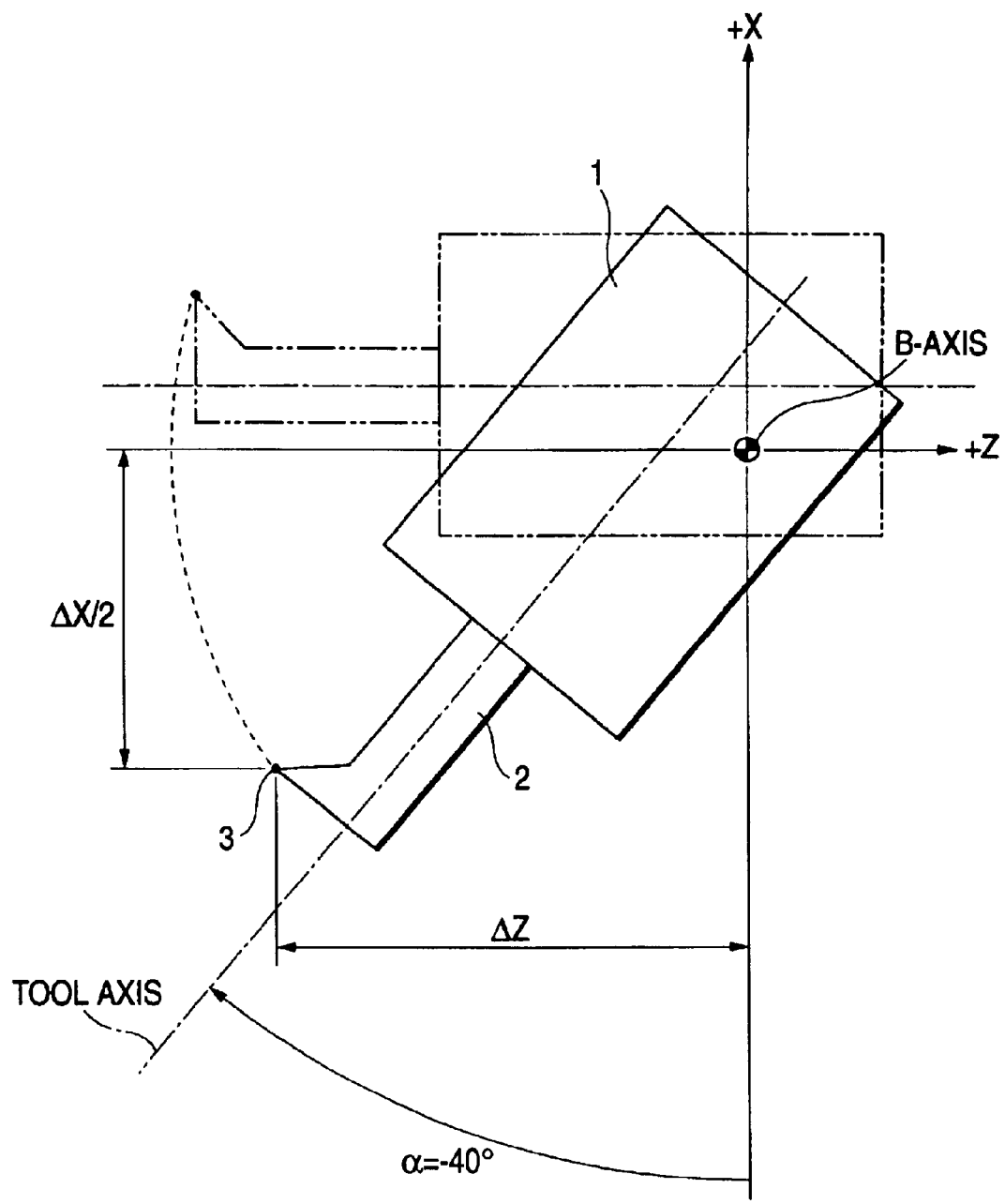
FIG. 2 is a view of turning the turret 1 (a turning angle is –40 degree)
Figure 3:
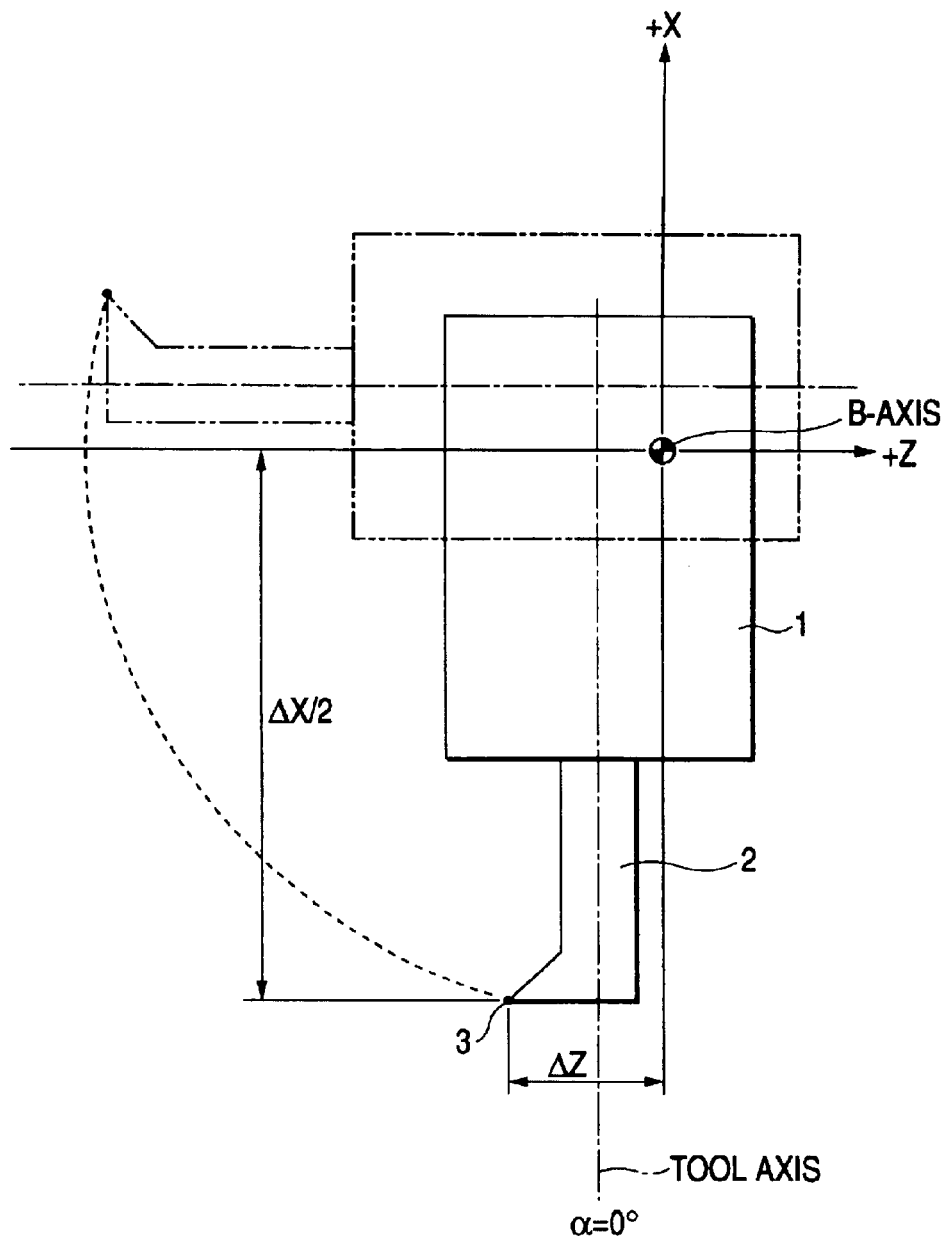
FIG. 3 is a view of turning the turret 1 (a turning angle is –0 degree)

Moreover, the cutting machine to which this invention is applied is such that the turret 1 turns around the B-axis to be fixed at an arbitrary turning angle (α) (indexing), and conduct the cutting work. The turret 1 turned around the B-axis is shown in FIGS. 2 and 3. The turning angle (α) is –90 degree in FIG. 1, –40 degree in FIG. 2, and 0 degree in FIG. 3. As shown in FIGS. 1 to 3, the B-axis is based on a negative direction of the X-axis, and a clockwise direction is regarded as a negative direction in the following description.

It is to be noted that definitions of the above mentioned X-axis, Z-axis and B-axis are the same as prescribed by JIS. The cutting machine may have the same structure as in the conventional art except the control apparatus, and will be omitted in the drawings.

B: Control Apparatus

Figure 4:
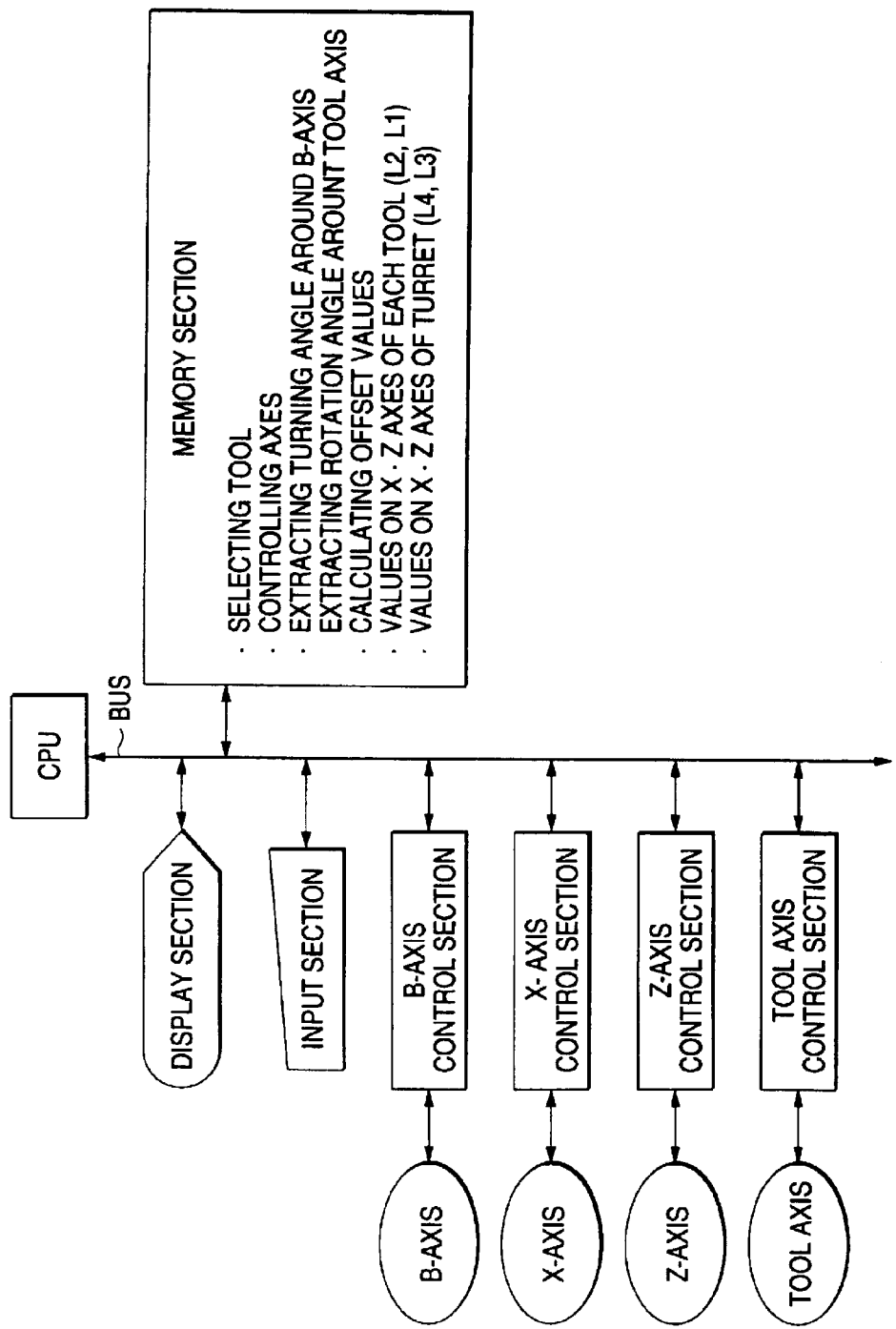
FIG. 4 is a block diagram of a control apparatus.

The structure of the control apparatus is shown in FIG. 4 in a block diagram. The control apparatus includes a CPU for conducting various processes, a display for indicating offset values (ΔX, ΔZ, ΔY) and wear compensation values (ΔXt, ΔZt, ΔYt), an input section for inputting various numerical values, and a memory section for storing various programs, values of the cutting tool 2 (L2, L1) on the X and Z axes of the tool, and values of the turret 1 (L4, L3) on the X and Z axes of the turret. These sections transmit and receive data through a bus.

In addition, since the turret 1 turns around the B-axis in this invention, the control apparatus includes a B-axis control section for reading out its turning angle (α). The control apparatus further includes an X-axis control section and a Z-axis control section as an ordinary cutting machine. In the case of the cutting machine which can rotate around a tool axis of the cutting tool 2, the control apparatus includes a tool axis control section for controlling the rotation of the cutting tool 2.

The above mentioned display may employ a liquid crystal display or CRT. The input section may employ a keyboard, a touch panel, etc. The memory section can be embodied by appropriately combining various kinds of memory means, such as RAM, ROM, hard disk, etc.

This memory section stores the X-axis value of the turret (L4) and the Z-axis value of the turret (L3), which are offset values concerning the turret 1, and the X-axis value of the tool (L2) and the value of the Z-axis of the tool (L1) on every tool mounted. Here, the X-axis value of the tool (L2) means a distance from a center of the tool to an edge thereof in a direction of the X-axis, and the X-axis value of the turret (L4) means a distance from the center of the tool to the B-axis (the center of the turn) in a direction of the X-axis. In an embodiment in which the cutting tool 2 rotates around the tool axis as described below, these value (L2) on the X-axis of the tool and the value (L4) on the X-axis of the turret mean distances from the tool axis.

The memory section also stores a program for calculating the offset values, a program for conducting cutting according to an ordinary numerical control, and a program for giving instructions to the respective axis control sections.

"The axis control sections" such as "B-axis control section" or so are respectively associated with a motor, and serve to drive the motor according to the instructions for the numerical control which are given from the CPU to vary the relative distance between the cutting tool 2 and the workpiece 4 with respect to the directions of the axes. "The axis control sections" have also such functions of reading the turning angle (α) when the turret 1 is manually turned, and the turning angle (β) when the cutting tool 2 is manually rotated, to transmit them to the CPU.

C: Flow of Operation

Figure 6:
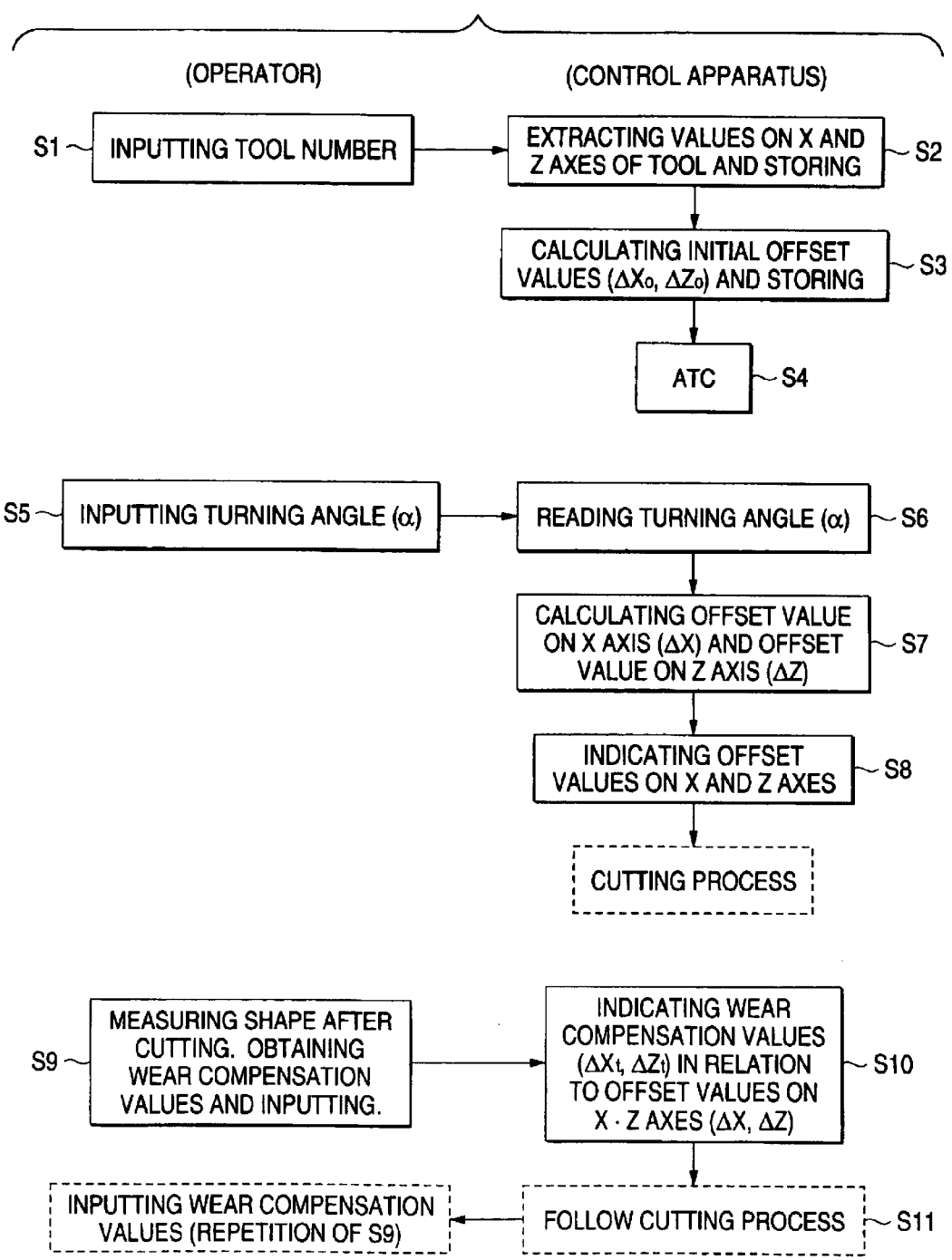
FIG. 6 is a flow chart showing steps of carrying out the invention.

Manner of indicating the offset values on the X-axis (ΔX) and the offset values on the Z-axis (ΔZ) of the edge 3 of the cutting tool in this control apparatus will be described below. Flow of the operation is shown in FIG. 6.

(S1) The operator inputs a tool number suitable for the cutting process. The inputted number is transmitted from the input section to the CPU by way of the bus.

(S2) The CPU conducts a search in the memory section using the tool number, and reads the X-axis value of the tool (L2) and the Z-axis value of the tool (L1) of the selected cutting tool 2. The CPU also reads the X-axis value of the turret (L4) and the Z-axis value of the turret (L3) of the turret 1 which have been stored in advance. The CPU moreover reads type of the selected tool whether it is for turning or milling. In this embodiment, the tool is for turning, and the X-axis value of the tool (L2) is set to be "−10", the Z-axis value of the tool (L1) is set to be "100", the X-axis value of the turret (L4) is set to be "−1", and the Z-axis value of the turret (L3) is set to be "300". In the drawings, differences between the distances are emphasized to clearly show the values.

In order to indicate positive and negative of the X-axis value of the tool (L2), directions of the tool axis as seen from the cutting edge 3 of the cutting tool in a state where the B-axis is at −90 degree are shown by the positive and the negative directions of the X-axis. In FIG. 1, as the tool axis is directed downward (in the negative direction of the X-axis) as seen from the edge, it is regarded as (−10). In order to indicate positive and negative of the X-axis value of the turret (L4), directions of the B-axis (the center of the turn) as seen from the tool axis are shown by the positive and the negative directions of the X-axis. In FIG. 1, as the B-axis is directed downward (in the negative direction of the X-axis) as seen from the tool axis, it is regarded as (−1). On the other hand, the Z-axis value of the tool (L1) and the Z-axis value of the turret (L3) are always positive values.

(S3) The CPU calculates the X-axis offset value (ΔX0) and the Z-axis offset value (ΔZ0) when the turning angle is −90 degree (at the initial position) This initial position is not particularly restricted, and although it is the position of −90 degree in this embodiment, the initial position may be any other positions. The initial X-axis offset value (ΔX0) is twice as much as a sum (ΔAx) of the X-axis value of the tool (L2) and the X-axis value of the turret (L4) to indicate it by diameter. In this embodiment, by entering "α=−90" into the following equation (1), $$\Delta X0 = \{\Delta Az \cdot \cos(-90) - \Delta Ax \cdot \sin(-90)\} \times 2 \quad \text{(Equation 1)}$$

$$\Delta Ax = L2 + L4 = -11, \Delta Az = L1 + L3 = 400$$

the result of ΔX0=−22.00 is obtained.

On the other hand, the initial Z-axis offset value (ΔZ0) is a sum (ΔAz) of the Z-axis value of the tool (L1) and the Z-axis value of the turret (L3). In this embodiment, by entering "α=−90" into the following equation (2), $$\Delta Z0 = -\Delta Az \cdot \sin(-90) - \Delta Ax \cdot \cos(-90) \quad \text{(Equation 2)}$$

the result of ΔZ0=400 is obtained.

Then, the X-axis offset value (ΔX0) and the Z-axis offset value (ΔZ0) thus calculated are outputted on the display. FIG. 5 shows a specific example of the display. As shown in FIG. 5, the type of the tool is indicated as "turning" on the display. "−90 degree" is indicated as the turning angle at the initial position, "−22.00" and "400.00" are respectively indicated on the X-axis and on the Z-axis as the initial offset values.

(S4) The CPU transmits the tool number to an ATC (Automatic Tool Changer). The ATC attaches the selected tool to the turret 1.

(S5) The operator inputs the turning angle (α) of the turret 1. In this embodiment, −40 degree is inputted as the turning angle (α).

(S6) The inputted turning angle (α) is read by the CPU, and stored in it temporarily. The CPU transmits the turning angle (α) to the B-axis control section, and the B-axis control section drives the motor to turn the turret 1 by the turning angle (α). A position of the turret 1 at the turning angle of −40 degree is shown in FIG. 2.

(S7) The CPU calculates, according to the following equations (1) and (2), the X-axis offset value (ΔX) and the Z-axis offset value (ΔZ) after the turn, employing the turning angle (α), and the X-axis value of the tool (L2), the Z-axis value of the tool (L1), and the X-axis value of the turret (L4), and the Z-axis value of the turret (L3) which have been read as described above.

$$\Delta X = \{\Delta Az \cdot \cos(-40) - \Delta Ax \cdot \sin(-40)\} \times 2 \quad \text{(Equation 1)}$$

$$\Delta Ax = L2 + L4 = -11, \Delta Az = L1 + L3 = 400$$

$$\Delta Z = -\Delta Az \cdot \sin(-40) - \Delta Ax \cdot \cos(-40) \quad \text{(Equation 2)}$$

As the result of the calculation, ΔX is "598.69" and ΔZ is "265.54".

(S8) The CPU indicates the X-axis offset value (ΔX) and the Z-axis offset value (ΔZ) thus calculated on the display. In FIG. 5, they are indicated in a second column in the table. In this manner, in the control apparatus according to the invention, to whichever position the turret 1 has been turned, the offset values of the edge of the tool are indicated as the values on the coordinates relative to the cutting machine (the values on the coordinates relative to the initial position). Accordingly, the operator can obtain and input the wear compensation values as described below, regardless of the position of the turret 1. Because these wear compensation values can be easily obtained, errors in calculating and inputting the wear compensation values will be decreased.

S9: Indication of the Wear Compensation Values

The control apparatus conducts the cutting process (a first cutting) according to the ordinary cutting program. After the cutting, the operator measures sizes of the workpiece 4, grasps differences between target sizes and actual sizes, and conduct a second cutting corresponding to the differences in size (conducts a so-called "follow" cutting).

In this embodiment, the operator inputs "−0.09" as the X-axis wear compensation value ($\Delta Xt$) and "−0.04" as the Z-axis wear compensation value ($\Delta Zt$), referring to the calculated offset values on the X-axis ($\Delta X$) of "598.69" and on the Z-axis ($\Delta Z$) of "265.54".

(S10) The control apparatus reads the inputted wear compensation values ($\Delta Xt, \Delta Zt$), and indicates them on the display. On this occasion, these wear compensation values ($\Delta Xt, \Delta Zt$) are related to the X-axis offset value ($\Delta X$) and the Z-axis offset value ($\Delta Z$). In FIG. 5, the X-axis wear compensation value ($\Delta Xt$) is indicated below the offset values on the X-axis ($\Delta X$), and the Z-axis wear compensation value ($\Delta Zt$) is indicated below the Z-axis offset value ($\Delta Z$)

(S11) The control apparatus conducts the follow cutting on the basis of the inputted wear compensation values ($\Delta Xt, \Delta Zt$).

(S12) Thereafter, the operator measures the sizes of the workpiece after every cutting process, and inputs the wear compensation values for a second and a third cuttings, and conducts the follow cuttings to a finished product having the designed sizes. The control apparatus indicates the wear compensation values ($\Delta Xt, \Delta Zt$) in relation to the X-axis offset value ($\Delta X$) and the Z-axis offset value ($\Delta Z$), on each time when the wear compensation values are inputted. In FIG. 5, "−0.09" is indicated as the X-axis wear compensation value and "−0.04" is indicated as the Z-axis wear compensation value, at the first cutting. As the wear compensation values for the second and successive cuttings, "−0.24" and "−0.09" which are smaller than the previous compensation values are respectively inputted and indicated.

When $\alpha$=0 Degree

Further, the offset values ($\Delta X, \Delta Z$) when the turning angle is 0 degree as shown in FIG. 3 are indicated in a lower column of FIG. 5. When $\alpha$=0 degree, $$\Delta X = \{\Delta Az \cdot \cos(0) - \Delta Ax \cdot \sin(0)\} \times 2 \qquad \text{(Equation 1)}$$

$$\Delta Ax = L2 + L4 = -11, \Delta Az = L1 + L3 = 400$$

the result of $\Delta X = 800$ is obtained, and $$\Delta Z = -\Delta Az \cdot \sin(0) - \Delta Ax \cdot \cos(0) \qquad \text{(Equation 2)}$$

the result of $\Delta Z = 11$ is obtained.

D: Other Embodiments (1) In the above step (S5), the operator has inputted the turning angle ($\alpha$), and the control apparatus has turned the turret 1 on the basis of this inputted value. However, this invention can be also applied to an embodiment in which the turret 1 is manually rotated to an arbitrary position.

In this case, the control apparatus reads the turning angle ($\alpha$) of the turret 1 which has been turned manually, from the B-axis control section, and stores this turning angle ($\alpha$). Then, the control apparatus calculates the offset values on the X-axis and on the Z-axis, employing the values.

(2) In the above described step (S10), the wear compensation values ($\Delta Xt, \Delta Zt$) are indicated in relation to the offset values on the X-axis and on the Z-axis ($\Delta X, \Delta Z$). Besides the manner of indicating the wear compensation values ($\Delta Xt, \Delta Zt$) below the offset values on the X-axis and on the Z-axis ($\Delta X, \Delta Z$), they can be indicated at sides of the offset values on the X-axis and on the Z-axis ($\Delta X, \Delta Z$). Alternatively, the offset values and the wear compensation values can be indicated in different colors so as to be recognized in relation to each other.

(3) In the above described steps (S3), (S4), after the initial offset values have been indicated, the process has been shifted to the step of the ATC. However, this order is not particularly restricted, but a manner of indicating the initial offset values ($\Delta X0, \Delta Z0$) after the tool has been mounted can be also put into practice.

E: Rotation Around the Tool Axis (1) Usually, the cutting tool 2 is used in a position mounted to the turret 1. However, according to cutting conditions, the cutting tool 2 may be used in a state directed oppositely, or in a state where the edge is directed in other directions (in a state where the cutting tool 2 is rotated around the tool axis). In this case, in order to prepare a cutting program, not only the above described X-axis value of the tool (L2) but the offset value of the edge in a direction of the Y-axis ($\Delta Y$) should be taken into consideration.

The above described X-axis value of the tool (L2r), the X-axis offset value ($\Delta Xr$) and the Z-axis offset value ($\Delta Zr$), and the Y-axis offset value ($\Delta Y$), in an embodiment in which the cutting tool 2 rotates around the tool axis will be described referring to FIGS. 7 to 9. In the description, "r" is affixed to the signs of the values when the cutting tool 2 has rotated. However, the Y-axis offset value is not affixed with "r", because this offset value is arisen only when the tool has rotated.

Figure 7:
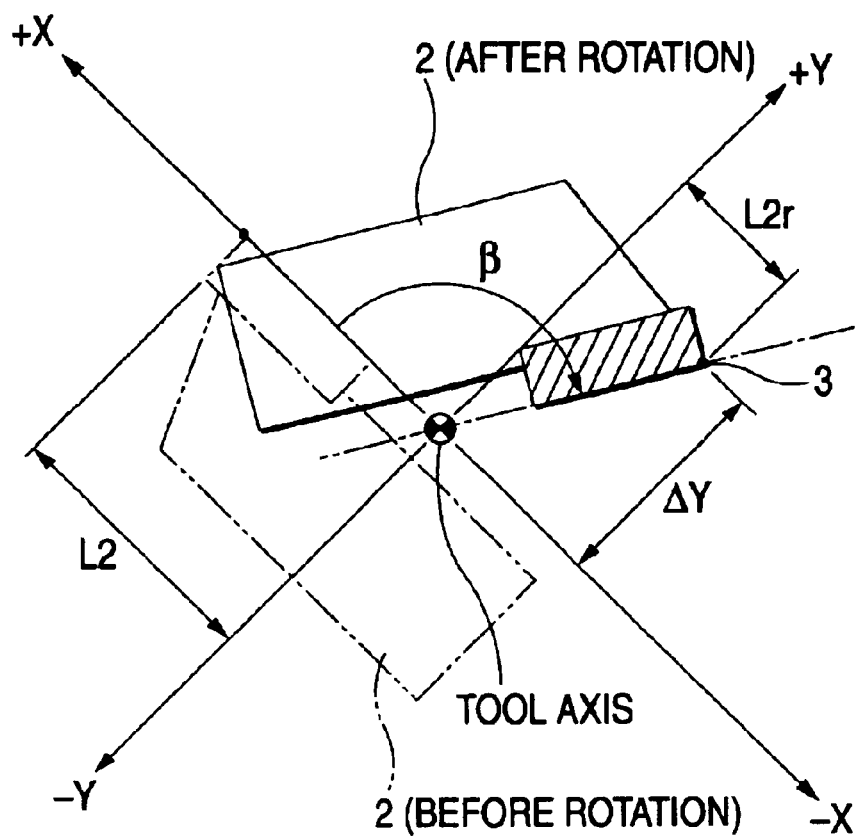
FIG. 7 is a view of rotating a cutting tool 2.
Figure 8:
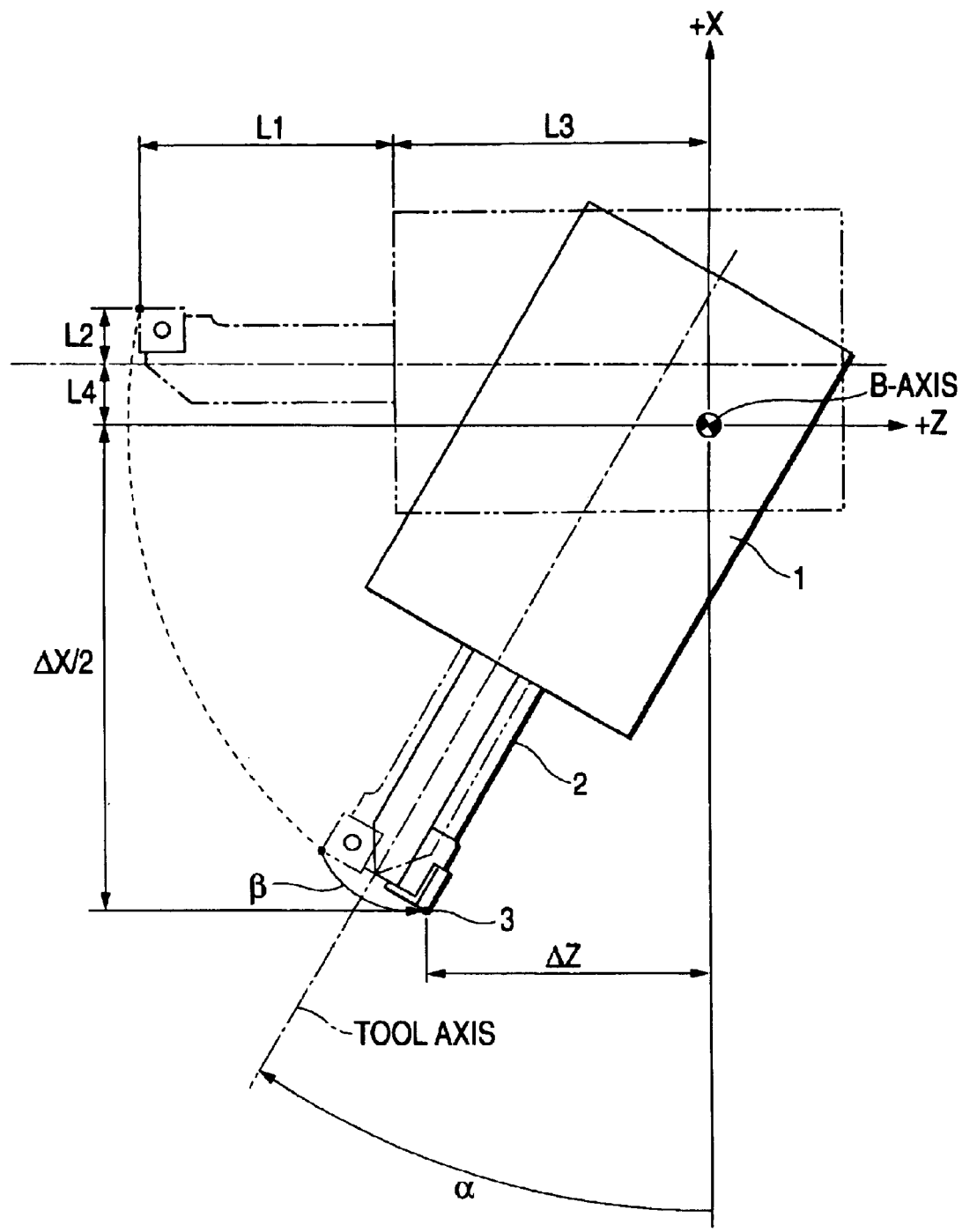
FIG. 8 is a view of turning and rotating the cutting tool 2.

FIG. 7 shows a tool nose of the cutting tool 2 mounted to the turret 1 (before and after the rotation) FIG. 8 shows a state in which the turret 1 has turned by the turning angle ($\alpha$) and further, the cutting tool 2 has rotated around the tool axis. FIG. 9 shows a specific example of the image displaying the offset values on this occasion. The rotation angle ($\beta$) is relative to the X-axis, and a clockwise rotation as seen from the cutting edge is shown as positive.

(2) The cutting tool 2 as shown in a dotted line in FIG. 7 is shown in the initial state when it has been mounted to the turret 1, and the cutting tool 2 as shown in a solid line is shown in a state after it has rotated by the rotation angle ($\beta$). In the drawing, a tool nose portion of the tool having the cutting edge 3 of the cutting tool (a portion of an exchangeable component) is hatched.

In the drawing, the cutting tool 2 rotates around the tool axis. A direction of the cutting edge in the initial state of the cutting tool 2 is set as the direction of the X-axis, and a direction perpendicular to this X-axis on the same plane is set as the direction of the Y-axis. The direction in which this X-axis is set is not particularly restricted, but can be implemented in such a manner that it is relative to the direction of the cutting edge in the initial state of the cutting tool 2, as shown in the drawing. In FIG. 7, since the cutting tool 2 is mounted in a state where the cutting edge is directed to the upward left, the upward and leftward direction is set as the X-axis. In the description, the X-axis value of the tool (L2), the Z-axis value of the tool (L1), the X-axis value of the turret (L4), and the Z-axis value of the turret (L3) are the same as in the above described embodiment, as follows;

$$(L1=100, L2=-10, L3=300, L4=-1)$$

(3) In this embodiment, the cutting tool 2 rotates to an arbitrary position around the tool axis. Therefore, the X-axis value of the tool (L2) and the X-axis value of the turret (L4) are defined as distances from the tool axis. The cutting tool 2 which has rotated by the rotation angle ($\beta$) of 120 degree is shown in a solid line. The X-axis value of the tool (L2r) of the cutting edge 3 after the rotation can be obtained from the following equation.

$$L2r = L2 \cdot \cos \beta = (-10) \cdot \cos 120 = 5$$

Then, the X-axis offset value ($\Delta Xr$) is obtained from the equation, $\Delta Xr=(L2r+L4)\times 2$.

$$\Delta Xr=\{5+(-1)\}\times 2=8.$$

The CPU in the control apparatus indicates this $\Delta Xr=8$ on the display. In this manner, even when the cutting tool 2 is rotated to the arbitrary position around the tool axis, the operator can grasp the X-axis offset value, regardless of the rotation angle ($\beta$) of the cutting tool 2, thus facilitating the input of the wear compensation values.

(4) Moreover, according to this invention, in the above described embodiment, the Y-axis offset value ($\Delta Y$) when the cutting tool 2 has rotated to an arbitrary angle is converted to the value on the coordinate based on the cutting machine, and indicated. As shown in FIG. 7, the Y-axis offset value ($\Delta Y$) is obtained from the equation, $(\Delta Y)=L2\cdot\sin\beta$. In this embodiment, $(\Delta Y)=-10\cdot\sin(120)=-8.66$. The CPU in the control apparatus indicates this value, $(\Delta Y)=-8.66$ on the display. In this manner, when the cutting tool 2 has been rotated, the operator can grasp the Y-axis offset value, regardless of the rotation angle ($\beta$) of the cutting tool 2, facilitating the input of the wear compensation values.

A method of obtaining the values of the cutting edge after the rotation, relative to the coordinates in the initial position of the cutting tool 2 as described above is referred to as a method of converting it to the values on the coordinates relative to the cutting machine. Positive or negative of the Y-axis offset value is determined according to the direction of the cutting edge 3 with respect to the tool axis. In FIG. 7, the offset value is negative, because the tool axis is directed to the downward left from the cutting edge, that is, negative direction of the Y-axis.

(5) Then, an embodiment of indicating the offset values ($\Delta Xr$, $\Delta Zr$, $\Delta Y$) in case where the turning angle ($\alpha$) of the turret 1 is −40 degree, and the rotation angle ($\beta$) of the cutting tool 2 is 120 degree will be described.

(i) The steps (S1) to (S8) as shown in FIG. 6 are the same in the previous embodiment in which only the turret 1 turns. The offset values ($\Delta X$, $\Delta Z$, $\Delta Y$) when the turning angles of the turret 1 are −90 degree, −40 degree are shown in FIG. 9. In the case where $\alpha$=−90 degree, −40 degree, the offset values ($\Delta X$) and ($\Delta Z$) are the same as those in FIG. 5, and the Y-axis offset value ($\Delta Y$) is "0.00", because the cutting edge is not rotated.

(ii) Then, the operator inputs the rotation angle of 120 degree from the input means. The control apparatus stores this value, and gives instructions for rotating the tool axis to the tool axis control section by way of the bus. This can be also implemented in such a manner that the operator rotates the cutting tool 2 manually, and the tool axis control section reads the rotation angle ($\beta$)

(iii) Means for calculating the X-axis value of the tool (L2r), the X-axis offset value ($\Delta Xr$) and the Y-axis offset value ($\Delta Y$) when the rotation angle ($\beta$) is 120 degree are the same as described in the above items (3) and (4). Specifically, the following calculation is conducted employing the equations (3), (4).

the X-axis value of the tool:

$$L2r=L2\cdot\cos\beta=(-10)\cdot\cos 120=5$$

$$\Delta Axr=L2r+L4=5+(-1)=4$$

$$\Delta Az=L1+L3=400$$

$$\Delta X=\{400\cdot\cos(-40)-(4)\cdot\sin(-40)\}\times 2=617.98 \quad\text{(Equation 3)}$$

$$(\Delta Y)=-10\cdot\sin(120)=-8.66$$

Further, the Z-axis offset value is as follows;

$$\Delta Zr=-\Delta Az\cdot\sin(-40)-\Delta Axr\cdot\cos(-40)=-(400)\cdot\sin(-40)-(4)\cdot\cos(-40)= 254.05 \quad\text{(Equation 4)}$$

(iv) The CPU indicates the X-axis offset value ($\Delta X$) on the display, the Z-axis offset value ($\Delta Z$) and the Y-axis offset value ($\Delta Y$) thus calculated. A specific example of the image is shown in a third column of FIG. 9. In this manner, even when the cutting tool 2 is rotated, the operator can recognize the offset values of the cutting edge as the values on the coordinates relative to the state provided with the cutting tool 2, regardless of the direction (extent of the rotation) of the cutting tool 2, thus facilitating the input of the wear compensation values.

(v) The steps of measuring the sizes, inputting the wear compensation values, and indicating these values are the same as in FIG. 6. The X-axis wear compensation value ($\Delta Xt$), the Z-axis wear compensation value ($\Delta Zt$) and the Y-axis wear compensation value ($\Delta Yt$) in relation to the offset values ($\Delta Xr$, $\Delta Zr$, $\Delta Y$) are shown in a fourth column of FIG. 9. In this embodiment, the X-axis wear compensation value ($\Delta Xt$) "−0.08", the Z-axis wear compensation value ($\Delta zt$) of "−0.05" and the Y-axis wear compensation value ($\Delta Yt$) of "0.06" are respectively indicated. The wear compensation values inputted on the second and the successive cuttings are indicated in order of the input.

(6) In FIG. 9, there are indicated the offset values in three directions of the X-axis, the Z-axis and the Y-axis. It is not always necessary to indicate these offset values in the three directions in implementing this invention, but a manner of indicating only either one of them can be implemented. Further, a manner of indicating the values in combinations of the X-axis and the Z-axis, the X-axis and the Y-axis, and the Z-axis and the Y-axis can be also implemented.

What is claimed is:

1. A control apparatus for numerical control of a cutting machine comprising a turret which is rotatable about a turret axis and a cutting tool attached to the turret and rotatable about a tool axis, wherein:

an X-axis value (L2r) of a cutting edge of said cutting tool when said cutting tool is rotated about said tool axis to a tool rotation angle ($\beta$) is calculated according to the equation of $L2r=L2\cdot\cos\beta$; and an X-axis offset value ($\Delta Xr$) and a Z-axis offset value ($\Delta Zr$) when said turret is turned to a turret rotation angle ($\alpha$) are calculated according to the following equations 3 and 4, wherein said X-axis offset value ($\Delta Xr$) after the rotation of said cutting tool and said Z-axis offset value ($\Delta Zr$) after the rotation of said cutting tool are indicated on a display:

$$\Delta Xr=(\Delta Az\cdot\cos\alpha-\Delta Axr\cdot\sin\alpha)\times 2 \quad\text{(Equation 3)}$$

$$\Delta Axr=L2r+L4$$

$$\Delta Az=L1+L3$$

$$\Delta Zr=-\Delta Az\cdot\sin\alpha-\Delta Axr\cdot\cos\alpha \quad\text{(Equation 4)},$$

wherein L1 is a Z-axis value of the tool, L4 is an X-axis value of the turret and L3 is a Z-axis value of the turret.

2. A control apparatus according to claim 1, wherein an X-axis wear compensation value ($\Delta Xt$) and a Z-axis wear compensation value ($\Delta Zt$) are indicated in relation to said X-axis offset value ($\Delta X$) and said Z-axis offset value ($\Delta Z$).

3. A control apparatus according to claim 1, wherein when said turret is turned to a turning angle ($\alpha$), an X-axis value of the tool (L2), a Z-axis value of the tool (L1), an X-axis value of the turret (L4) and a Z-axis value of the turret (L3) are converted according to the following equations to calculate said X-axis offset value ($\Delta X$) and said Z-axis offset value ($\Delta Z$);

$$\Delta X=(\Delta Az\cdot\cos\alpha-\Delta Ax\cdot\sin\alpha)\times 2 \quad \text{(Equation 1)}$$

$$\Delta Ax=L2+L4$$

$$\Delta Az=L1+L3$$

$$\Delta Z=-\Delta Az\cdot\sin\alpha-\Delta Ax\cdot\cos\alpha \quad \text{(Equation 2)}.$$

4. A control apparatus according to claim 2, wherein when said turret is turned to a turning angle ($\alpha$), an X-axis value of the tool (L2), a Z-axis value of the tool (L1), an X-axis value of the turret (L4) and a Z-axis value of the turret (L3) are converted according to the following equations to calculate said X-axis offset value ($\Delta X$) and said Z-axis offset value ($\Delta Z$);

$$\Delta X=(\Delta Az\cdot\cos\alpha-\Delta Ax\cdot\sin\alpha)\times 2 \quad \text{(Equation 1)}$$

$$\Delta Ax=L2+L4$$

$$\Delta Az=L1+L3$$

$$\Delta Z=-\Delta Az\cdot\sin\alpha-\Delta Ax\cdot\cos\alpha \quad \text{(Equation 2)}.$$

* * * * *